United States Patent
Ermatschenko et al.

(10) Patent No.: US 11,201,346 B2
(45) Date of Patent: Dec. 14, 2021

(54) CASCADED FUEL CELL STACK AND FUEL CELL SYSTEM

(71) Applicants: AUDI AG, Ingolstadt (DE); Volkswagen AG, Wolfsburg (DE)

(72) Inventors: Natalja Ermatschenko, Wolfsburg (DE); Christian Lucas, Braunschweig (DE); Gerold Hübner, Braunschweig (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 16/490,437

(22) PCT Filed: Dec. 6, 2018

(86) PCT No.: PCT/EP2018/083734
§ 371 (c)(1),
(2) Date: Aug. 30, 2019

(87) PCT Pub. No.: WO2019/141429
PCT Pub. Date: Jul. 25, 2019

(65) Prior Publication Data
US 2021/0288343 A1  Sep. 16, 2021

(30) Foreign Application Priority Data
Jan. 17, 2018  (DE) ...................... 10 2018 200 687.3

(51) Int. Cl.
*H01M 8/241* (2016.01)
*H01M 8/1004* (2016.01)
(Continued)

(52) U.S. Cl.
CPC ....... *H01M 8/241* (2013.01); *H01M 8/04291* (2013.01); *H01M 8/1004* (2013.01);
(Continued)

(58) Field of Classification Search
CPC .. H01M 8/241; H01M 8/2457; H01M 8/1007; H01M 8/04291; H01M 8/1004; H01M 8/1067; H01M 9/249; H01M 8/04149; H01M 2008/1095; H01M 2250/20
See application file for complete search history.

(56) References Cited

U.S. PATENT DOCUMENTS 4,543,303 A * 9/1985 Dantowitz .......... H01M 8/1007
429/450
2001/0049037 A1  12/2001 St-Pierre et al.
(Continued)

FOREIGN PATENT DOCUMENTS

DE  10 2006 051 433 A1  5/2007
DE  10 2007 060 719 A1  6/2009
(Continued)

*Primary Examiner* — Victoria H Lynch
(74) *Attorney, Agent, or Firm* — Seed Intellectual Property Law Group LLP

(57) ABSTRACT

A fuel cell stack is provided comprising a plurality of fuel cells comprising a membrane electrode assembly and at least one gas diffusion layer, which fuel cells are divided into at least one first fuel cell segment having a portion of the plurality of fuel cells and a second fuel cell segment having a different portion of the plurality of fuel cells, wherein the first fuel cell segment and the second fuel cell segment are arranged in a common fuel cell cascade, wherein the first fuel cell segment comprises a first collector inlet line for an operating medium and a first collector outlet lined which is formed integrally with a second collector inlet line of the second fuel cell segment and wherein the second fuel cell segment comprises a second collector outlet line. The membrane electrode assemblies and/or the gas diffusion layers inside the second fuel cell segment are designed in such a way that they are more water-repellent than those of the first fuel cell segment. A fuel cell system comprising such a fuel cell stack is also provided.

10 Claims, 2 Drawing Sheets

(51) Int. Cl.
  *H01M 8/249* (2016.01)
  *H01M 8/1007* (2016.01)
  *H01M 8/04291* (2016.01)
  *H01M 8/1067* (2016.01)
  *H01M 8/2457* (2016.01)
  *H01M 8/04119* (2016.01)
  *H01M 8/1018* (2016.01)

(52) U.S. Cl.
  CPC ....... *H01M 8/1007* (2016.02); *H01M 8/1067* (2013.01); *H01M 8/249* (2013.01); *H01M 8/2457* (2016.02); H01M 8/04149 (2013.01); H01M 2008/1095 (2013.01); H01M 2250/20 (2013.01)

(56) References Cited

U.S. PATENT DOCUMENTS

| | | |
|---|---|---|
| 2002/0192530 A1 | 12/2002 | Kabumoto et al. |
| 2005/0233181 A1 | 10/2005 | Wariishi et al. |
| 2007/0128479 A1 | 6/2007 | Ballantine et al. |
| 2007/0207353 A1 | 9/2007 | Logan |
| 2007/0218344 A1 | 9/2007 | Ji et al. |
| 2017/0012297 A1 | 1/2017 | Tanimura et al. |

FOREIGN PATENT DOCUMENTS

| | | |
|---|---|---|
| DE | 103 93 165 B4 | 11/2012 |
| EP | 0 596 366 A1 | 5/1994 |
| JP | 2002-151120 A | 5/2002 |
| JP | 2004-67880 A | 3/2004 |
| JP | 2006-294594 A | 10/2006 |
| JP | 2007-18821 A | 1/2007 |
| JP | 2007-242306 A | 9/2007 |
| JP | 2009-16074 A | 1/2009 |
| JP | 2009-230902 A | 10/2009 |
| JP | 2011-198520 A | 10/2011 |
| JP | 2016-195105 A | 11/2016 |
| JP | 2018-511914 A | 4/2018 |
| KR | 10-2005-0004729 A | 1/2005 |
| WO | 2008/101921 A1 | 8/2008 |
| WO | 2015/125749 A1 | 8/2015 |

* cited by examiner

CASCADED FUEL CELL STACK AND FUEL CELL SYSTEM

BACKGROUND

Technical Field

Described herein is a fuel cell stack having a plurality of fuel cells comprising a membrane electrode assembly and at least one gas diffusion layer. At least two gas diffusion layers are preferably provided in each case. The fuel cells are divided into at least a first fuel cell segment having a portion of the plurality of fuel cells and a second fuel cell segment having a different or further portion of the plurality of fuel cells. The first fuel cell segment and the second fuel cell segment are arranged in a common fuel cell cascade. The first fuel cell segment comprises a first collector inlet line for an operating medium and a first collector outlet line formed integrally with a second collector inlet line of the second fuel cell segment. The second fuel cell segment also includes a second collector outlet line. Further described herein is a corresponding fuel cell system, such as for use in a motor vehicle, with such a fuel cell stack. The first collector outlet line, which is formed integrally or in one piece with the second collector inlet line, can also be understood as a single (collector) component.

DESCRIPTION OF THE RELATED ART

US 2007/0128479 A1 shows a cascading or cascaded fuel cell stack having collector outlet lines of a first fuel cell segment simultaneously constitute the collector inlet lines of a downstream second fuel cell segment. The advantage of such a cascade-like stack is that the individual fuel cell segments have a higher stoichiometry than the entire or complete fuel cell stack. Optimum designs provide the same stoichiometry per segment, and this is achieved in known solutions by a different number of fuel cells in the two fuel cell segments. It has been found that when an operating medium enters the first fuel cell segment, the operating medium should first be humidified in order to ensure an optimum reaction sequence. There is the risk of water accumulation in the second fuel cell segment, which is located downstream. This water accumulation leads to operational instabilities. In order to discharge accumulated water, use is frequently made of an increased stoichiometry.

BRIEF SUMMARY

Described herein is a fuel cell stack of the type mentioned initially and a fuel cell system in such a way that stable operation with optimized water management is achieved.

As described herein, the membrane electrode assemblies and/or the gas diffusion layers within the second fuel cell segment are designed to be more water-repellent than those of the first fuel cell segment. This means that the components of the second fuel cell segment thus have a hydrophobic effect that is more pronounced than is the case with the components of the first fuel cell segment. The first fuel cell segment is therefore designed for dry inlet conditions and a small amount of water, while the second fuel cell segment is designed for high gas humidity and a large amount of water.

For example, membranes which differ from those of the second fuel cell segment can be used in the first fuel cell segment. The use of a proton-conductive membrane which is formed from a perfluorosulfonic acid polymer (PFSA) has proven to be advantageous. Such a membrane has a high oxidative stability. Alternatively, a sulfonated hydrocarbon polymer (HC) can be used as the membrane. This membrane is characterized by a lower gas permeation with the same thickness of the membranes as compared to the perfluorosulfonic acid polymer membranes. It is thereby possible for the membrane electrode assemblies of the first fuel cell segment to be formed with a membrane of a first ionomer type, and for the membranes of the membrane electrode assemblies of the second fuel cell segment to be formed from a second ionomer type. The ionomer types are selected in such a way that in comparison to the first fuel cell segment, a more water-repellent second fuel cell segment is produced.

In one possible embodiment of the fuel cell stack, the equivalent weight of the membranes of the membrane electrode assemblies of the first fuel cell segment is less than the equivalent weight of the membranes of the membrane electrode assemblies of the second fuel cell segment. In this case, an ionomer having a lower equivalent weight has a higher water storage capacity than an ionomer with a higher equivalent weight.

The electrodes (anode/cathode) of the membrane electrode assembly typically include carbon-based supports that are connected to each other by a preferably framework-like ionomer. In this case, the supports can have catalytically active particles, e.g., platinum nanoparticles. The equivalent weight of the ionomer of the electrodes in the first fuel cell segment may also be less than the equivalent weight of the ionomer of the electrodes in the second fuel cell segment.

The equivalent weight of the ion-conductive membranes or of the ionomer of the electrodes is preferably between 600 grams and 1200 grams. For example, the equivalent weight of the ion-conductive membranes or of the ionomer of the electrodes of the first fuel cell segment is between 600 grams and 830 grams. The equivalent weight of the ion-conductive membranes or of the ionomer of the electrodes of the second fuel cell segment is preferably between 830 grams and 1100 grams, more preferably between 900 grams and 1000 grams.

In another advantageous embodiment, the thickness of the membranes of the first fuel cell segment is less than the thickness of the membranes of the second fuel cell segment. In a further advantageous embodiment, the thickness of the membranes of the first fuel cell segment is between 4 micrometers (μm) and 12 micrometers and the thickness of the membranes of the second fuel cell segment is between 14 micrometers and 35 micrometers. In dry application conditions, the water balance can be improved by the thinner membrane; in this case, water transport is facilitated.

Another alternative embodiment is characterized in that the gas diffusion layers of the second fuel cell segment have a greater porosity than those of the first fuel cell segment. The greater porosity facilitates the discharge of water from the fuel cell stack, in particular from the second fuel cell segment, and thus where a higher humidity occurs. For example, the average pore size of the gas diffusion layers of the first fuel cell segment is less than 5 micrometers, preferably even less than 1 micrometer. The average pore size of the second fuel cell segment is then greater than 5 micrometers, for example, 10 micrometers. Water absorption and flooding possibly resulting therefrom within the second fuel cell segment can thus be prevented. Alternatively or additionally, the thickness of the gas diffusion layers of the first fuel cell segment may be less than the thickness of the gas diffusion layers of the second fuel cell segment.

In order to additionally facilitate the discharge of water from the second fuel cell segment, it has proven to be advantageous for the gas diffusion layers of the second fuel cell segment to have a hydrophobic coating. This hydrophobic coating can, for example, be a polymer and copolymer of vinylidene fluoride, tetrafluoroethylene, ethylene, propylene and hexafluoropropylene. In order to coat, treat or impregnate the gas diffusion layer, a solution or dispersion of, for example, polyvinylidene fluoride (PVDF), polytetrafluoroethylene (PTFE) or poly(tetrafluoroethylene co-ethylene) may be used.

The gas diffusion layer can also be designed to have several parts and comprise a microporous layer and a macroporous layer. The microporous layer may have an average pore size of less than 5 micrometers, preferably of less than 1 micrometer. The macroporous layer has an average pore size that is greater than 5 micrometers. While the microporous layer and/or the macroporous layer of the gas diffusion layers of the second fuel cell segment can be provided with a hydrophobic coating, the microporous layer and/or the macroporous layer of the gas diffusion layers of the first fuel cell segment can be provided with a hydrophilic coating in an alternative embodiment. Typical hydrophilic coatings may, for example, consist of tin oxide ($SnO_2$), titanium dioxide ($TiO_2$) or even carbon black (e.g., Black Pearls® 1000 or 2000) or mixtures thereof. This ensures that the components of the second fuel cell segment are more water-repellent than those of the first fuel cell segment.

Alternatively or additionally, the fuel cells may comprise one or more bipolar plates having a flow field for providing reaction media. In this case, the bipolar plates of the first fuel cell segment may be provided with a hydrophilic coating that makes them more water-attracting. Alternatively or additionally, the bipolar plates of the second fuel cell segment may be provided with a hydrophobic coating that makes them more water-repellent.

Alternatively or additionally, the fuel cell stack may also be designed such that the membrane electrode assemblies and/or the gas diffusion layers have a hydrophobicity gradient running between the first collector inlet line and the second collector outlet line. Due to this hydrophobicity gradient, the section of the cascaded fuel cell stack that is closer to the inlet side is more water-attracting than the section disposed closer to the outlet side. In other words, the inlet side is thus more water-attracting than the outlet side.

BRIEF DESCRIPTION OF THE SEVERAL VIEWS OF THE DRAWINGS

Additional advantages, features and details emerge from the claims, the following description and by reference to the drawings. The following is shown:

DETAILED DESCRIPTION

Figure 1:
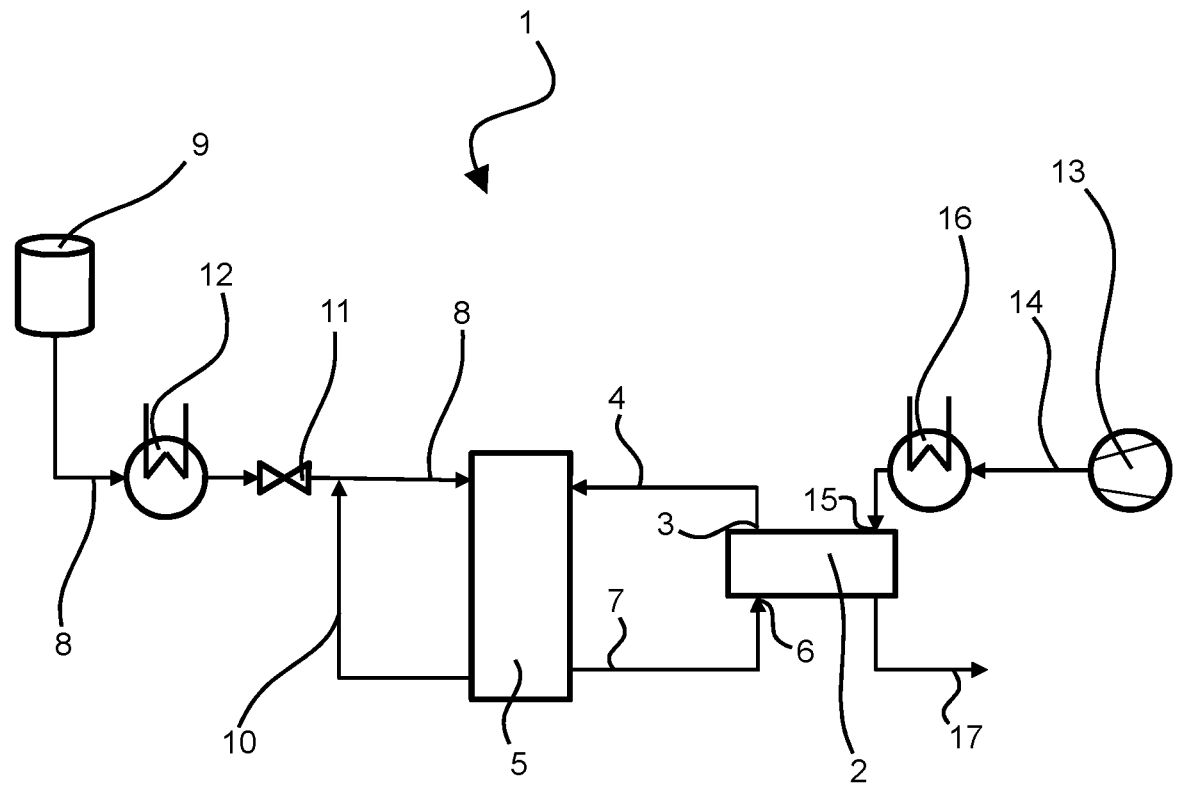
FIG. 1 a schematic representation of a fuel cell system having a cascaded fuel cell stack, FIG. 2 a schematic representation of a cascaded fuel cell stack, and FIG. 3 a schematic sectional view through a fuel cell (unit cell).

FIG. 1 shows a fuel cell system 1 which has a humidifier 2 on the cathode side. With its cathode-side outlet 3, the humidifier 2 is connected via a cathode supply line 4 to cathode spaces of a cascaded fuel cell stack 5. In addition, the humidifier 2 is connected with its cathode-side inlet 6 to the cathode spaces via a cathode exhaust gas line 7 through which unreacted cathode gas or moist cathode exhaust gas is returned to the humidifier 2. The cathode gas (e.g., air or oxygen) can be routed through the cathode spaces to the cathodes 30 of the plurality of fuel cells 18 arranged in the cascaded fuel cell stack 5. The cathode gas is drawn in by means of a compressor 13 and then introduced into a supply line 14. In the example shown, the incoming compressed cathode gas is cooled by means of a (recuperative) heat exchanger 16 before being fed into a cathode gas inlet 15 of the humidifier 2 for humidification. The humidifier 2 is composed of a plurality of water-vapor-permeable humidifier membranes that are designed to remove moisture from the cathode exhaust gas. The moisture is in this case routed to the cathode gas flowing on the compressor side into the humidifier 2. The remaining exhaust gas can then be discharged from the humidifier 2 by means of an exhaust gas line 17. Proton-conductive membranes 19 separate the cathodes 30 from the anodes 31 of the fuel cells 18, wherein fuel (e.g., hydrogen) may be supplied to the anodes 31 via anode spaces. For this purpose, the anode spaces are connected to a fuel storage 9 via an anode supply line 8. Fuel not reacted at the anodes 31 can be recirculated to the anode spaces via an anode recirculation line 10. Advantageously, a recirculation blower, not shown in greater detail, may in this case be associated with the anode recirculation or is coupled into the anode recirculation line 10 in a fluid-mechanical manner. In order to regulate the supply of fuel, a fuel actuator 11 is assigned to the anode supply line 8 or is arranged in the anode supply line 18. This fuel actuator 11 may take the form of a pressure-regulating valve. In the example shown, a heat exchanger 12 in the form of a recuperator for heating or controlling the temperature of the fuel is provided upstream of the pressure-regulating valve.

Figure 2:
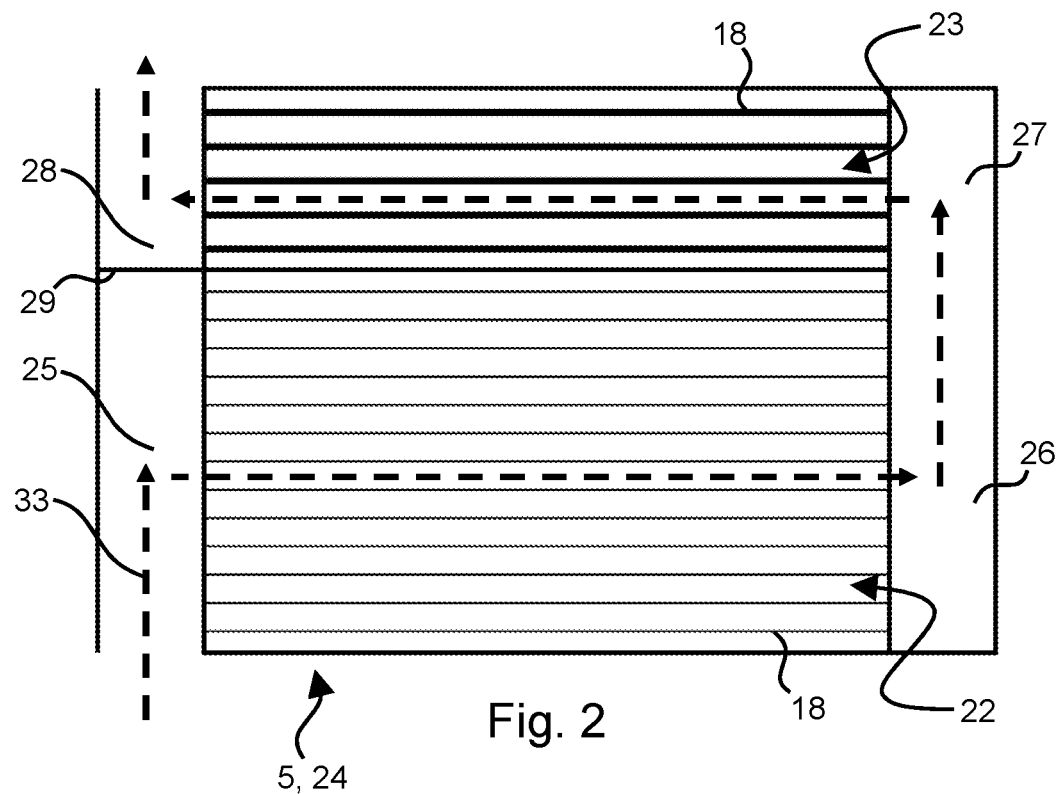

In FIG. 2, the cascaded fuel cell stack 5 is shown in more detail. "Cascaded" is to be understood to mean a cascading or cascade-like design or a cascading structure of the fuel cell stack 5. The fuel cell stack 5 is divided into a first fuel cell segment 22 having a portion of the plurality of fuel cells 18 (lower part in the figure) and a second fuel cell segment 23 having another, preferably complementary portion of the plurality of fuel cells 18 (upper part in the figure). The first fuel cell segment 22 and the second fuel cell segment 23 are arranged in a common fuel cell cascade 24. The fuel cell stack 5 may have a cascaded design with regard to the cathode gas (e.g., air or oxygen), with regard to the anode gas (e.g., hydrogen) or with regard to both operating media.

FIG. 2 shows the flow 33 of the operating medium or of the gas mass flow which undergoes a plurality of direction changes due to the cascade-like design. In order to be able to supply an operating medium to the fuel cell stack 5, the first fuel cell segment 22 has a first collector inlet line 25. An operating medium supplied to the first collector inlet line 25 is in particular supplied laterally to the fuel cells 18 (or to the operating medium spaces provided by bipolar plates 34 by means of a flow field), where it is—at least partially—consumed, before it exits the fuel cells 18 again and passes into the first collector outlet line 26 on the side of the first fuel cell segment 22 that is opposite the first collector inlet line 25. The first collector outlet line 26 is formed integrally, i.e., in one piece, with a second collector inlet line 27 of the second fuel cell segment 23. The operating medium can then in turn enter, in particular laterally, the fuel cells 18 (or the operating medium spaces provided by bipolar plates 34 by means of a flow field) of the second fuel cell segment 23, where a further portion of the operating medium is consumed. The operating medium, which is at least partially further consumed, then exits the fuel cells 18 of the second fuel cell segment 23 and passes into a second collector outlet line 28. From the second collector outlet line 28, operating medium exhaust gas can then, for example, leave the fuel cell stack 5 or pass into another adjacent fuel cell segment 22, 23.

In the present case, the first collector inlet line 25 and the second collector outlet line 28 are formed as a common line, which in this case however has a barrier 29 or partition for separating the first fuel cell segment 22 from the second fuel cell segment 23. The number of fuel cells 18 in the first fuel cell segment 22 and the number of fuel cells 18 in the second fuel cell segment 23 can be defined as a function of the position of this partition 29.

In the case of the cascaded fuel cell stack 5 shown in FIG. 2, a division of the fuel cells 18 into approximately 70 percent (first fuel cell segment 22) and approximately 30 percent (second fuel cell segment 23) is shown by way of example. However, other divisions are possible, wherein the other divisions can in particular be based on the position of the partition 29.

Figure 3:
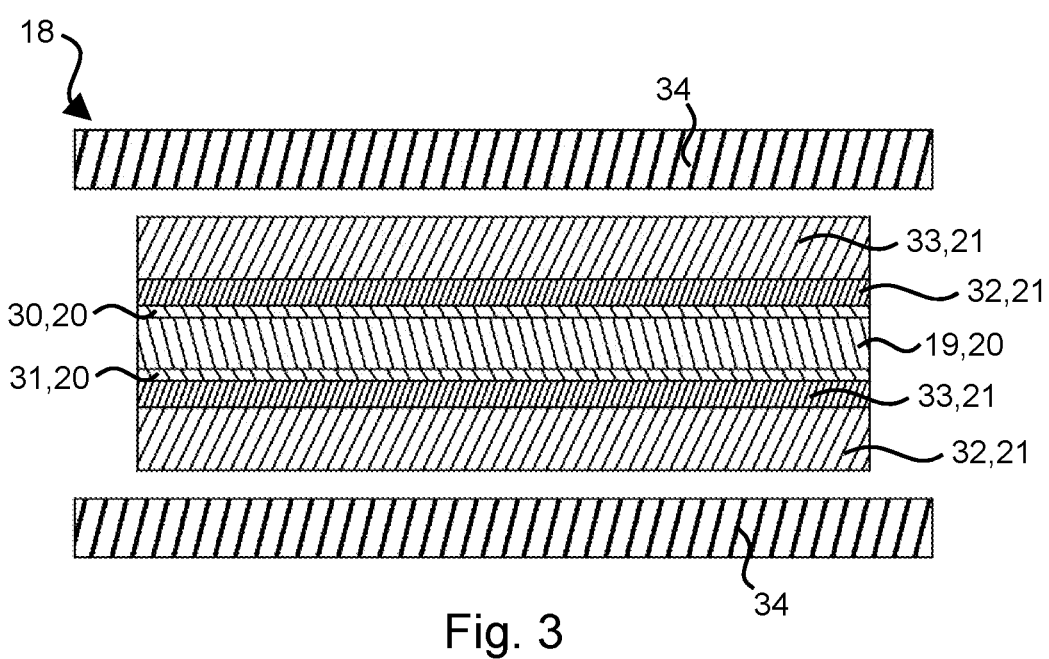

FIG. 3 shows by way of example a fuel cell 18 such as is used in the segments of the cascaded fuel cell stack 5. They comprise a membrane electrode assembly 20 to which in the present case two gas diffusion layers 21 are assigned. However, the gas diffusion layers 21 themselves can also form the electrodes of the membrane electrode assembly 20. In any case, the membrane electrode assembly 20 includes a first electrode (cathode 30) and a second electrode (anode 31) separated from each other by the proton-conductive membrane 19. To each of the two electrodes is assigned one of the gas diffusion layers 21 so that the respective operating medium can be distributed uniformly over the surface of the electrode and thus of the membrane 19. For a better distribution of the operating media, the gas diffusion layers 21 have a microporous layer 32 arranged adjacent to the electrodes or near the electrode and a macroporous layer 33 adjacent to the microporous layer 32. The pore size of the microporous layer 32 is very much smaller than the pore size of the macroporous layer 33. With their flow field, the bipolar plates 34 arranged next to the gas diffusion layers 21 provide the cathode or anode spaces for the fuel cell 18. For the sake of clarity, they are shown separated from the gas diffusion layers 21 but in their compressed state rest on them.

In the present case, the fuel cells 18 of the first fuel cell segment 22 differ from those of the second fuel cell segment 23 in that they have a less water-repellent structure. The different structure of the fuel cells 18 of the first fuel cell segment 22 and of the fuel cells 18 of the second fuel cell segment 23 is indicated in FIG. 2 by a different line width. The fuel cells 18 of the two segments can differ from each other with respect to the equivalent weights of the membranes 19, with respect to the ionomer types used for the membranes 19, with respect to the thickness of the membranes 19, with respect to the thickness of the gas diffusion layers 21, with respect to the pore diameter within the gas diffusion layers 21 and/or within the membranes 19, as well as with respect to their thermal conductivity or their capacity for water transportation and retention.

However, the design parameters are always selected such that stable operation can be ensured within the entire fuel cell stack 5 without any increase in stoichiometry.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fuel cell stack, comprising:
 a first fuel cell segment including a first plurality of fuel cells, wherein each of the fuel cells of the first plurality of fuel cells includes a membrane electrode assembly and at least one gas diffusion layer; and
 a second fuel cell segment including a second plurality of fuel cells, wherein each of the fuel cells of the second plurality of fuel cells includes a membrane electrode assembly and at least one gas diffusion layer,
 wherein the first fuel cell segment and the second fuel cell segment are arranged in a common fuel cell cascade wherein the first fuel cell segment includes a first collector inlet line for an operating medium and a first collector outlet line which is formed integrally with a second collector inlet line of the second fuel cell segment, wherein the second fuel cell segment includes a second collector outlet line, and wherein the membrane electrode assemblies and/or the gas diffusion layers of the fuel cells of the second plurality of fuel cells of the second fuel cell segment are more water-repellent than the membrane electrode assemblies and/or the gas diffusion layers of the fuel cells of the first plurality of fuel cells of the first fuel cell segment.

2. The fuel cell stack according to claim 1, wherein an equivalent weight of membranes of the membrane electrode assemblies of the first plurality of fuel cells of the first fuel cell segment is less than an equivalent weight of membranes of the membrane electrode assemblies of the second plurality of fuel cells of the second fuel cell segment.

3. The fuel cell stack according to claim 1, wherein a thickness of membranes of the membrane electrode assemblies of the first plurality of fuel cells of the first fuel cell segment is less than a thickness of membranes of the membrane electrode assemblies of the second plurality of fuel cells of the second fuel cell segment.

4. The fuel cell stack according to claim 3, wherein the thickness of the membranes of the membrane electrode assemblies of the first plurality of fuel cells of the first fuel cell segment is between 4 and 12 micrometers, and the thickness of the membranes of the membrane electrode assemblies of the second plurality of fuel cells of the second fuel cell segment is between 14 and 35 micrometers.

5. The fuel cell stack according to claim 1, wherein the gas diffusion layers of the fuel cells of the second plurality of fuel cells of the second fuel cell segment have a greater porosity than the gas diffusion layers of the fuel cells of the first plurality of fuel cells of the first fuel cell segment.

6. The fuel cell stack according to claim 1, wherein the gas diffusion layers of the fuel cells of the second plurality of fuel cells of the second fuel cell segment have a hydrophobic coating.

7. The fuel cell stack according to claim 1, wherein the gas diffusion layers of the fuel cells of the second plurality of fuel cells of the second fuel cell segment comprise a microporous layer and a macroporous layer, and the gas diffusion layers of the fuel cells of the second plurality of fuel cells of the second fuel cell segment have a hydrophobic coating on the microporous layer and/or the macroporous layer.

8. The fuel cell stack according to claim 1, wherein the gas diffusion layers of the fuel cells of the first plurality of fuel cells of the first fuel cell segment comprise a microporous layer and a macroporous layer, and the gas diffusion layers of the fuel cells of the first plurality of fuel cells of the first fuel cell segment have a hydrophilic coating on the microporous layer and/or on the macroporous layer.

9. The fuel cell stack according to claim 1, wherein the membrane electrode assemblies and/or the gas diffusion layers have a hydrophobicity gradient running between the first collector inlet line and the second collector outlet line.

10. A fuel cell system for a motor vehicle, comprising:
   a fuel cell stack including:
      a first fuel cell segment including a first plurality of fuel cells wherein each of the fuel cells of the first plurality of fuel cells includes a membrane electrode assembly and at least one gas diffusion layer; and
      a second fuel cell segment including a second plurality of fuel cells, wherein each of the fuel cells of the second plurality of fuel cells includes a membrane electrode assembly and at least one gas diffusion layer,
   wherein the first fuel cell segment and the second fuel cell segment are arranged in a common fuel cell cascade, wherein the first fuel cell segment includes a first collector inlet line for an operating medium and a first collector outlet line which is formed integrally with a second collector inlet line of the second fuel cell segment, wherein the second fuel cell segment includes a second collector outlet line, and wherein the membrane electrode assemblies and/or the gas diffusion layers of the fuel cells of the second plurality of fuel cells of the second fuel cell segment are more water-repellent than the membrane electrode assemblies and/or the gas diffusion layers of the fuel cells of the first plurality of fuel cells of the first fuel cell segment.

\* \* \* \* \*